United States Patent
Ziermann

[11] Patent Number: 5,289,359
[45] Date of Patent: Feb. 22, 1994

[54] DC-DC POWER CONVERTER INCLUDING SENSING MEANS FOR PROVIDING AN OUTPUT WHEN THE RESERVE POWER OF THE CONVERTER FALLS BELOW A PREDETERMINED AMOUNT FOR A GIVEN INPUT VOLTAGE

[75] Inventor: Mark S. Ziermann, Bolingbrook, Ill.

[73] Assignee: Charles Industries, Limited, Rolling Meadows, Ill.

[21] Appl. No.: 869,875

[22] Filed: Apr. 16, 1992

Related U.S. Application Data

[63] Continuation of Ser. No. 654,771, Feb. 13, 1991, abandoned.

[51] Int. Cl.⁵ .................... H02H 3/335; H04M 19/00
[52] U.S. Cl. .................... 363/21; 379/324; 379/413
[58] Field of Search ............ 379/401, 413; 363/21, 363/26; 323/906

[56] References Cited

U.S. PATENT DOCUMENTS

| | | |
|---|---|---|
| 4,429,186 | 1/1984 | Gartner . |
| 4,488,006 | 12/1984 | Essig et al. . |
| 4,704,670 | 11/1987 | Gradl et al. .................... 363/21 |
| 4,776,006 | 10/1988 | Comerford et al. ............. 379/159 |
| 4,791,659 | 12/1988 | Ross .................... 379/22 |
| 4,803,722 | 2/1989 | Schreiber .................... 379/413 |
| 4,825,350 | 4/1989 | Brackman .................... 363/21 |
| 4,899,269 | 2/1990 | Rouzies .................... 323/906 |
| 4,935,858 | 6/1990 | Panicali .................... 363/21 |
| 4,961,222 | 10/1990 | Johansson et al. .................... 379/413 |
| 5,144,544 | 9/1992 | Jenneve et al. .................... 363/21 |

Primary Examiner—William H. Beha, Jr.
Attorney, Agent, or Firm—Leydig, Voit & Mayer

[57] ABSTRACT

A DC to DC power converter in the form of a pulse-width modulator is shown which can sense via an indication of duty cycle how much reserve power is available for loads using the present input voltage. The device is for use at the end of a telephone line where the input voltage power supply impedance can be appreciable. When the reserve power, as detected in the power converter, reaches a minimum critical level, a signal is sent out requesting the voltage supply to increase the available voltage to the power converter.

7 Claims, 4 Drawing Sheets

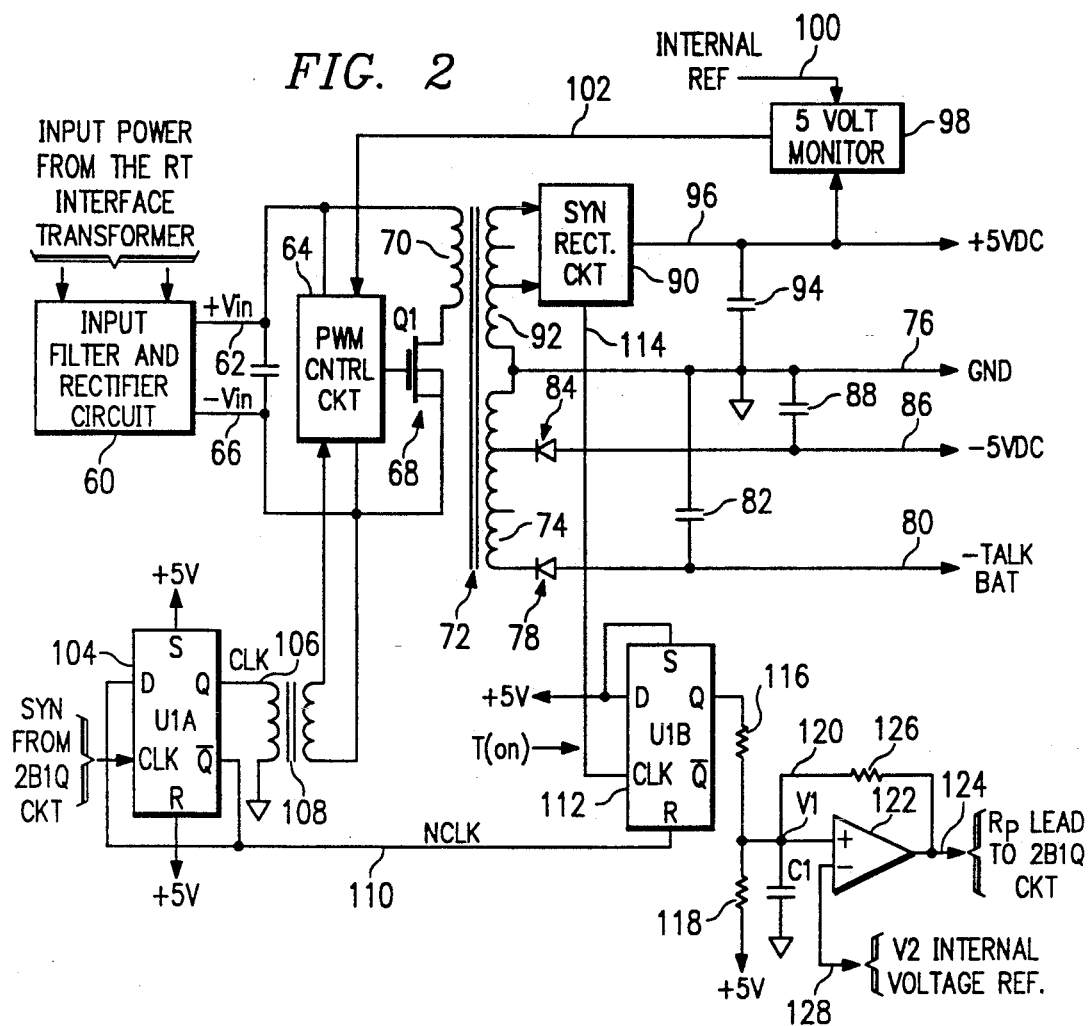
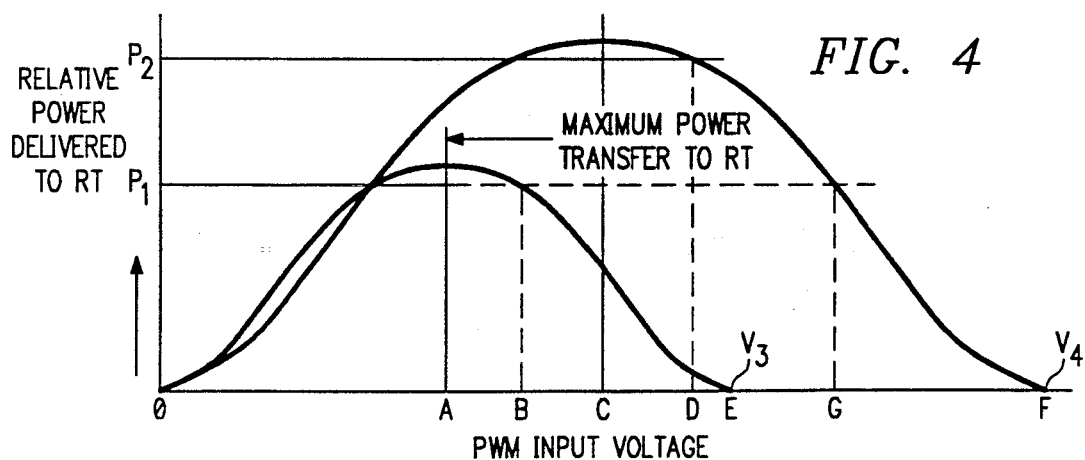

5,289,359

DC-DC POWER CONVERTER INCLUDING SENSING MEANS FOR PROVIDING AN OUTPUT WHEN THE RESERVE POWER OF THE CONVERTER FALLS BELOW A PREDETERMINED AMOUNT FOR A GIVEN INPUT VOLTAGE

This is a continuation of copending application Ser. No. 07/654,771 filed on Feb. 13, 1991, now abandoned.

THE INVENTION

The present invention is generally directed to electronics and more specifically directed to the problem of powering changing load impedances at a remote terminal from a central office terminal. Even more specifically the present invention is concerned with a pulse-width modulator operating in the discontinuous conduction mode for accomplishing the power conversion and wherein a monitoring of the duty cycle of the pulse-width modulator against a reference value can provide an indication of a critically low amount of reserve power in the power converter whereby a request for greater input voltage can be made.

BACKGROUND

Typically, telephones are all powered from the central office via a voltage supplied over a pair of telephone wires. The service is often referred to as POTS (plain old telephone service) quality lines. The CO (central office) normally supplies a −48 volts in an idle condition (called TALK BATTERY). When there is an incoming call, the CO superimposes an alternating ring signal upon the normal voltage to generate a signaling noise (phone ringing) at the remotely located telephone. The idle signal has specifications such that it is normally 48 volts and can, in some circumstances, be as high as 80 volts. The ringing signal adds additional potential such that the shock hazard under extreme conditions can be substantial and therefore the ring signal has to be interrupted.

It has always been desirable to have all telephones powered from high reliability CO, rather than locally so that telephones remain operational even though electrical power may have failed at the remotely located telephone site.

The introduction of digital signaling to telephones has allowed the capability of multiplexing more than one voice signal on a single pair of POTS quality lines. However, it is extremely desirable for any digital multiplexing approach to not require a change in the customer or CO equipment.

The present invention solves the problems of multiplexing more than one voice signal onto a single POTS line by attaching a COT (central office terminal) unit in the CO which interfaces several POTS lines and an RT (remote terminal) at a location remote from the COT but near a location with a plurality of customers (different telephone numbers). The RT receives power from the COT but detects ringing signals in the form of digital overhead signals on the line and directs a remotely generated ringing signal to a specific customer line. Each customer line may have a number of CPD (customer premise device(s)) such as telephones, faxes, modems, etc. In this application, reserve power is defined as the difference between the power the RT is consuming and the maximum available power. To minimize the amount of voltage applied by the COT, the RT also includes circuitry for detecting the reserve power available in a regulated power conversion unit located within the RT and returns a digital signal back to the COT when the reserve power in the RT falls below a prescribed level whereby the COT can increase the applied voltage to the lines interconnecting the COT and the RT thereby increasing the power available at the RT to supply any added loads or to provide power needed on high resistance POTS quality lines between COT and RT. The power conversion device in one embodiment of the inventive concept used a PWM (pulse-width modulator) which was designed to operate in the discontinuous conduction mode whereby maximum power transfer between the applied voltage to the pulse-width modulator and the output occurred at a 50% duty cycle. With this design, a point between 0% duty cycle, at which there would be no output from the PWM transformer and minimum current in the primary winding and the 50% duty cycle point can be picked as the reserve power call point. This is the point at which there is so little reserve power that a digital signal must be sent back to the COT to raise the input voltage and thus, change the duty cycle in a direction toward 0% which would give the required regulated output voltage called for by a PWM control circuit.

The concept described in this application and claimed by the claims herein is related to co-pending applications assigned to the same assignee as the present invention and filed on the same date. These applications are U.S. applications Ser. Nos. 07/655,677, 07/655 and 07/654,932. The application Ser. No. 07/654,932, while directed to the same general subject matter, comprises a different specification and all subject matter in said application is incorporated herein by reference.

It is thus an object of the present invention to provide an improved system for providing power from a COT to remotely located multi-line CPD's via the use of an RT containing a power supply and ring generator thereby allowing the use of digital signals either over the POTS lines or another source such as fiber optics to be received and control the signaling (ringing or forward disconnect) to the CPD's connected to the RT.

Other objects and advantages of the present invention will be apparent from a reading of the specification and appended claims in conjunction with the drawings wherein:

FIG. 1 comprises a block schematic diagram of a system incorporating the present inventive concept;

FIG. 2 is a schematic diagram of the pulse-width modulator power converter portion of FIG. 1;

FIG. 3 comprises a set of waveforms used in explaining the operation of FIG. 2;

FIG. 4 comprises a further set of waveforms used in explaining the operation of FIG. 2; and FIG. 5 shows a block diagram illustrating some of the different configurations of remote terminals and COT's as contemplated within the present inventive concept.

DETAILED DESCRIPTION

Figure 1:
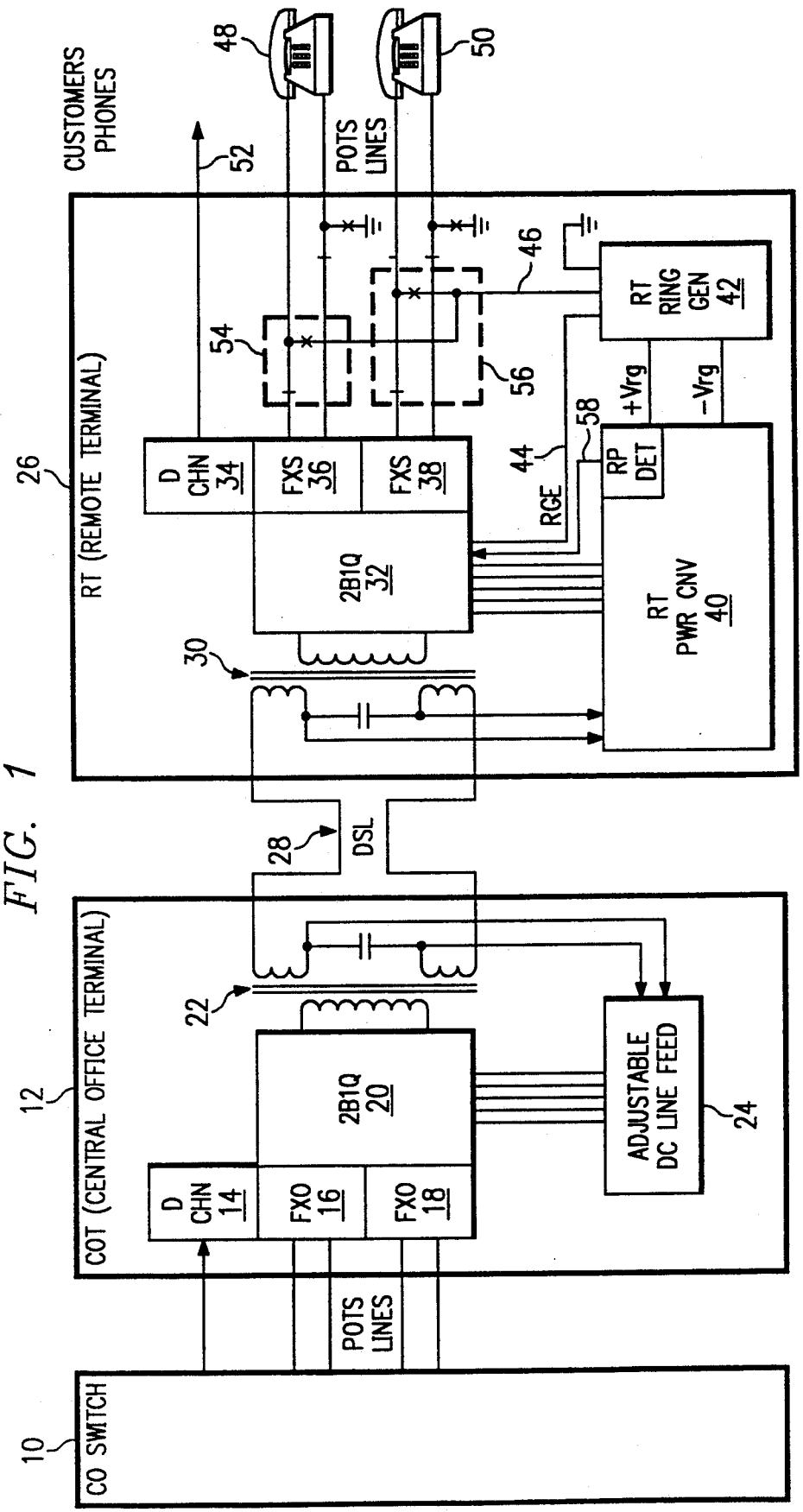

A central office switch 10 is connected by a plurality of leads to a COT (central office terminal) 12. Within COT 12 a small subset of equipment is shown comprising a D channel module 14, two FXO (foreign exchange office) modules 16 and 18, and a block 20 labeled 2B1Q. Also, within block 12 is a transformer 22 and an adjustable DC line feed block 24. A further block, which is an RT (remote terminal), is designated as 26. A pair of POTS quality lines labeled DSL, and numerically designated as 28, interconnect block 12 and block 26. Within block 26 a transformer 30 is connected to leads 28. A set of blocks 32, 34, 36 and 38 represent blocks complementary to 14 through 20 in COT 12. In other words, the signals on the lines supplied to blocks 14, 16 and 18 in the COT 12 are demultiplexed by 2B1Q block 32 into their component parts and distributed to blocks 34, 36 and 38. A remote terminal power conversion block 40 is connected to the transformer 30 as well as being connected to block 32 to supply regulated power thereto. Regulated output power is also supplied from block 40 to a remote terminal ring generator 42 which ring generator receives an input from block 32 via a lead 44 and supplies ring signals via a lead 46 to the POTS lines connected to each of two illustrated CPD's (customer premise devices) shown as telephone 48 and 50. The D channel block 34 also provides an output on a lead 52 for specialized digital equipment. A block 54 represents a switching mechanism for disconnecting the ring generator 42 output from being applied to block 36 when it is desired to ring the appropriate receiving device within telephone 48. A similar switching mechanism 56 provides the same function with respect to telephone 50. In this way, ring generator 42 can supply ringing signals to either of telephones 48 or 50 or both of them simultaneously, and the ringing signal is not applied to blocks 36 and 38. A lead 58 sends a RP (reserve power) signal from the power converter back through block 32 and the lines 28 to the COT 12 via circuitry within block 20 which detects that reserve power within block 40 has reached a critical lower limit. Upon receipt of this digital signal, block 20 supplies a signal to block 24 to increase the voltage supplied from block 24 through the secondary windings of transformer 22, through leads 28 and through the primary windings of transformer 30 to converter 40.

In FIG. 2 a block 60 receives input power from a remote terminal interface transformer such as transformer 30 of FIG. 1. Block 60 prevents the pulsations from the pulse-width modulator of FIG. 2 from returning to the transformer 30 and causing interference with line digital signals. Additionally, block 60 rectifies the incoming signal such that regardless of polarity, a positive signal is supplied to lead 62 and accordingly, to a pulse-width modulator control circuit 64. A negative signal is supplied on lead 66 to the pulse-width modulator control circuit 64 and to one power terminal of a switching transistor (a power FET in one embodiment) generally designated as 68. Switching transistor 68 is also designated as Q1 and has another power terminal connected to one end of a primary winding 70 of a transformer generally designated as 72. The other end of primary winding 70 is connected to lead 62. A first secondary winding of transformer 72 is designated as 74 and has one tap thereof connected to ground 76 and the opposite end connected to a cathode of a rectifier diode 78. The anode of diode 78 is connected to a -talk battery terminal lead 80. A smoothing capacitor 82 is connected between leads 76 and 80. A tap on winding 74 is connected to a cathode of a diode designated as 84 which has its anode connected to a −5 volt lead 86. A smoothing capacitor 88 is connected between lead 76 and lead 86. A synchronous rectifier circuit block 90 is connected to two leads of a further secondary winding 92 which has one end connected to ground 76. A capacitor 94 is connected between an output 96 of synchronous rectifier circuit 90 and ground 76. Lead 96 comprises a +5 volt dc output from the pulse-width modulator control circuit transformer 72. Thus, leads 96, 76, 86 and 80 and the related circuit connections are load impedance outputs for connection to loads whose impedance may vary. A 5 volt monitor circuit is designated as 98 and checks the +5 volt output on lead 96 against an internal reference designated as 100 and supplies a control signal on a lead 102 back to the pulse-width modulator control circuit 64. A synchronous input signal is received from a 2B1Q circuit such as block 32 of FIG. 1 at a clock input of a D flip-flop generally designated as 104. The D flip-flop 104 provides clock signals on an output lead 106 to be applied through a transformer 108 to the pulse-width modulator control circuit 64. $\overline{Q}$ output signals are supplied on a lead 110 as a NCLK (not clock signal) to a reset input of a further D flip-flop 112. Flip-flop 112 receives output signals from synchronous rectifier circuit 90 on a lead 114 at the clock input thereof. The lead 114 is also referred to as a T (on) signal. A 5 volt supply is connected to the D and S inputs of D flip-flop 112 as well as to the reset and set inputs of D flip-flop 104. The Q output of D flip-flop 112 is divided across two resistors 116 and 118 with resistor 118 being connected to a +5 volt power supply. An intermediate point between resistors 116 and 118 is labeled as 120 and also is indicated as being the voltage V1. This lead 120 is connected to a non-inverting input of an amplifier 122 which has an output labeled 124 and comprises the reserve power lead being returned to the 2B1Q circuit 32 of FIG. 1. In FIG. 1, this lead is labeled as 58. A feedback resistor 126 is shown connected between leads 124 and 120. A V2 internal voltage reference is shown on a lead 128 connected to the inverting input of amplifier 122.

Figure 3:
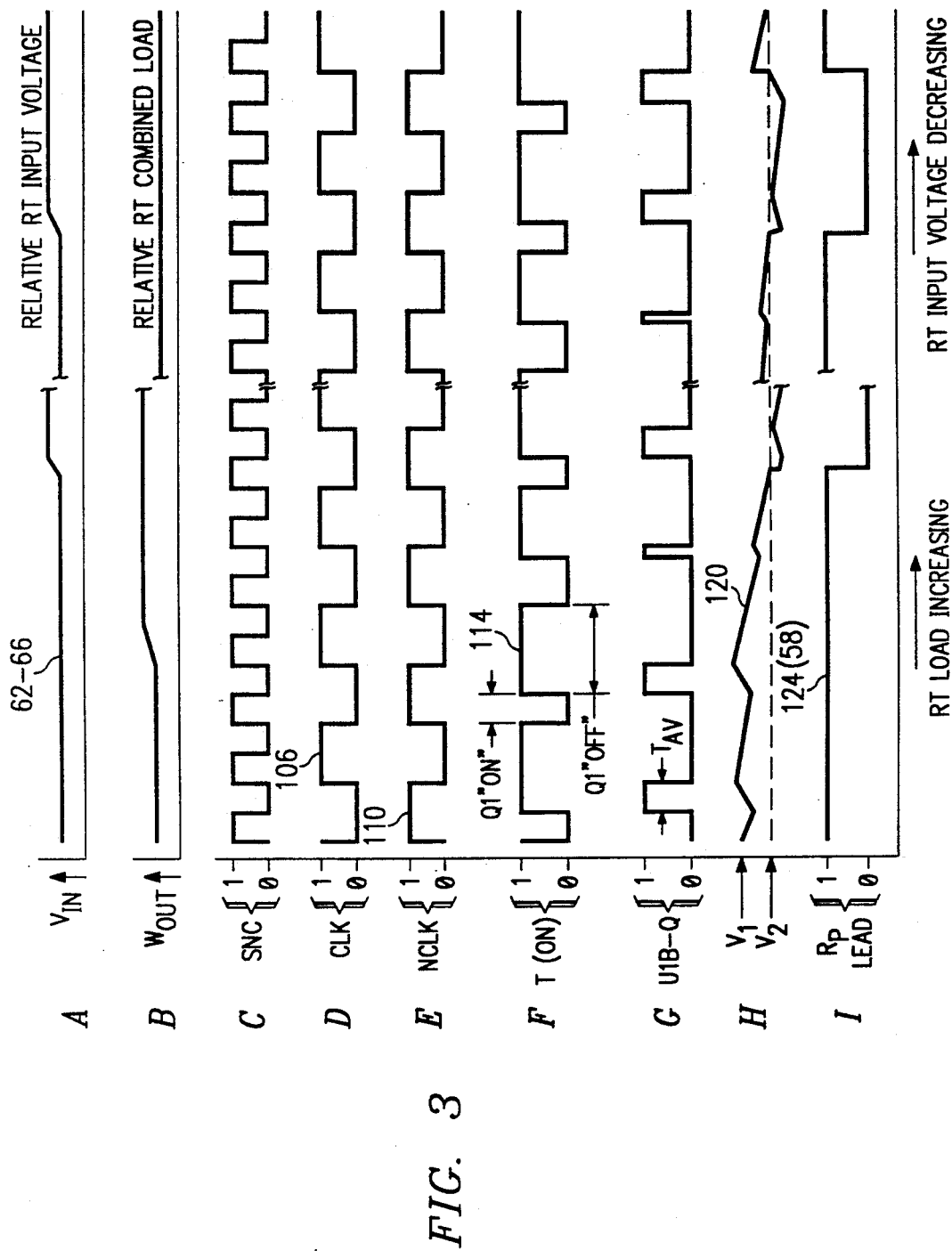

In FIG. 3 a first waveform A shows a relative remote terminal input voltage over a period of time with a discontinuous point partway across the page. This is the voltage between leads 62 and 66 of FIG. 2. Waveform B illustrates the watts consumed by the loads over a period of time so as to illustrate the effects on the other waveforms. A waveform C is representative of the synchronous signal applied to the clock input of D flip-flop 104. Waveform D is representative of the clock signal appearing on lead 106 of FIG. 2. Waveform E represents the waveform appearing on lead 110 in FIG. 2. Waveform F represents the waveform of the signal appearing on lead 114 of FIG. 2. Waveform G represents the waveform of the output signal on the Q output of D flip-flop 112. Waveform H represents the voltage V1 appearing at lead 120 as one input to amplifier 122 with V2 being the reference which causes an output on lead 124 to change when the voltages V1 and V2 change amplitude one relative to the other. Waveform I provides an indication of the changing reserve power lead amplitude.

FIG. 4 provides a representation of relative power delivered to equipment within RT 26 with two different supplied voltages V3 and V4. The horizontal axis of the graph of FIG. 4 represents pulse-width modulator input voltage for each of two distinct situations. The first situation is an initial voltage setting where V3 is the voltage applied to a remote terminal and the curve illustrates the power delivered to the RT where the duty cycle of the pulse-width modulator varies from 0% duty cycle at the point illustrated as E. A 50% duty cycle would be at the maximum power transfer point of point A. A power P1 is shown delivered to the unit at a point B on the horizontal curve which, for the purpose of discussion, may represent a 60% duty cycle. As long as the pulse-width modulator operates between points B and E, no output signal is provided on the RP lead 124. However, once the duty cycle of the pulse-width modulator reaches a point as represented by point B on the curve, it is recognized by the circuit that the reserve power left in the circuit is so small that a signal is supplied on RP to induce the central office terminal 12 to supply a higher voltage such as represented in maximum by point F on the curve of voltage V4. Assuming that the load had not changed, the circuit would immediately change to a duty cycle represented by the point G on curve V4 of FIG. 4 wherein the circuit could produce power up to that represented at point D, at which time a further increase in voltage would be required from the central office terminal. This further power at point D is represented by power P2 on the vertical axis.

Figure 5:
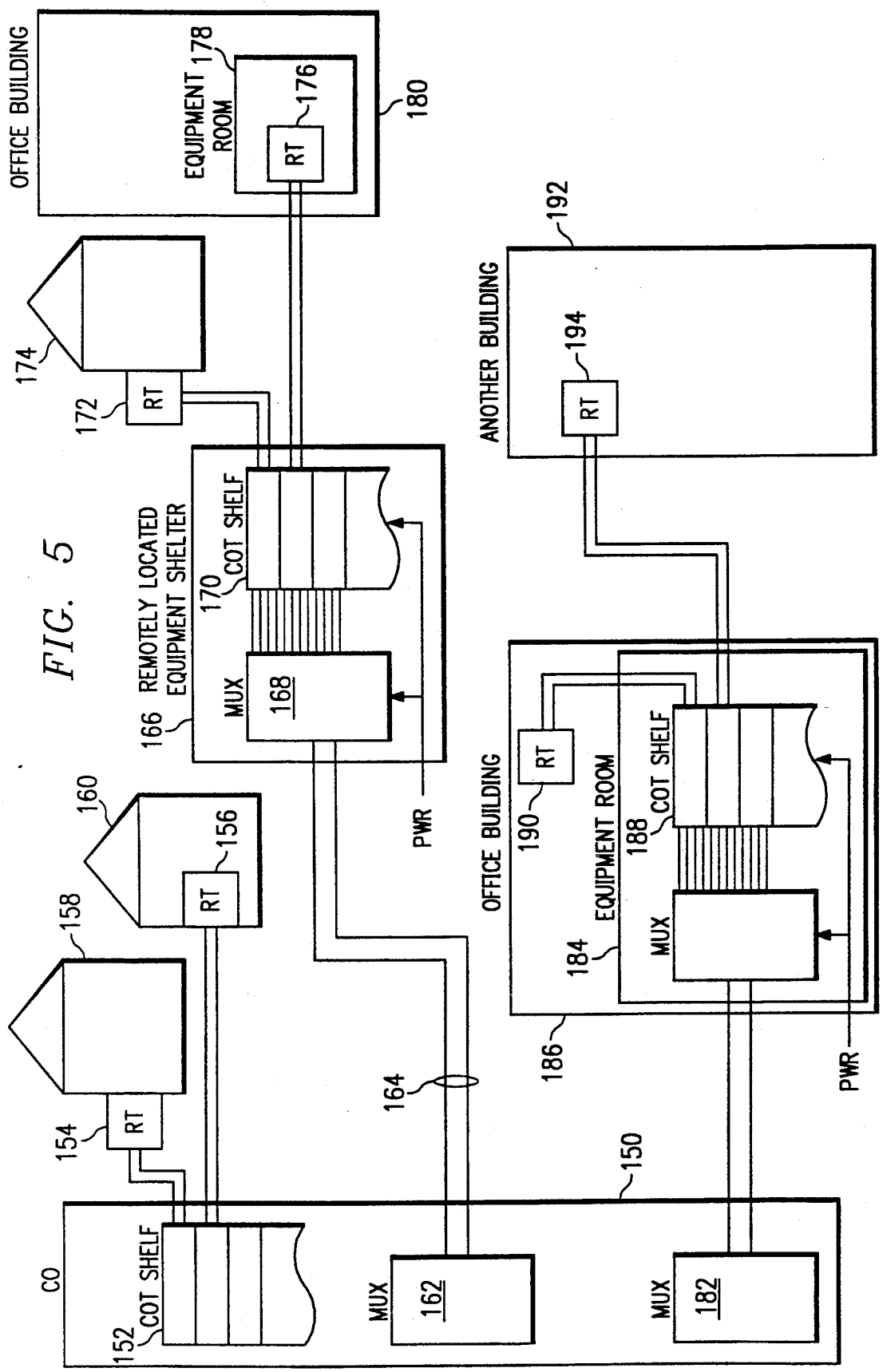

In FIG. 5 a central office is illustrated by a block 150 and the central office may contain a mixture of equipment such as a COT shelf 152 which supplies signals to a plurality of remote terminals such as 154 and 156. Remote terminal 154 provides data to customer premise devices within a facility designated as 158. Remote terminal 156 provides similar accommodations to building 160. A plurality of further remote terminals (not shown) would be connected to COT shelf 152. A multiplex block 162 is also shown within central office 150 connected by a high data rate set of lines designated as 164 to a remotely located equipment shelter 166. Within shelter 166 there is a multiplexer/demultiplexer block 168 which demultiplexes all the signals received on the set of leads 164 into a plurality of separate analog signals and supplies these to a COT shelf 170. COT shelf 170 is then connected to various remote terminals as illustrated. The RT 172 is shown connected external to building 174, the RT 176 is shown within an equipment room 178 in an office building 180. The significance is that the power for each of these remote terminals and all of the connected customer premise devices for these RT's is supplied from the remotely located equipment shelter 160 which has some reliable source of power. A further MUX 182 within CO 150 is connected to an equipment room 184 within an office building designated as 186 and having some reliable source of power. A COT shelf 188 within the room 184 is then connected to various remote terminals 190 within office building 186 as well as possibly to remote terminals in another office building such as building 192 illustrated with at least one remote terminal 194 designated in the drawing.

OPERATION

The present disclosure covers several concepts. A first of these concepts is how to more efficiently supply power to a remote location. The solution offered by the present invention comprises using a pulse-width modulated power supply at a remote location to convert an incoming variable DC voltage to a regulated voltage output. If the load requires more power than can be provided from the pulse-width modulator with the present input voltage, a digital signal is returned to the central office. At the central office, a detector detects the incoming digital signal and changes the output voltage in response to that digital signal. In this manner, a changeable and remotely located load can be supplied with adequate power without excessive voltage on the lines, thereby reducing the likelihood of shock to personnel that may come in contact with the lines.

A further problem addressed by the present invention is the ability to selectively ring more than one different telephone number CPD (customer premise device) using a single pair of supply wires. This is accomplished by providing digital overhead signals superimposed upon the DC supply voltage and providing a digital signal detector at the remote terminal. The detector can then selectively connect a ring generator signal to a specific customer premise device (one of a plurality of telephone numbers) using individual pairs of signals the remote location to each of the specific customer premise devices such as telephones, faxes, modems, etc. Not only does this provide a safety feature in reducing total voltages to the CPD, it increases utility of existing POTS line (which previously served only one customer) to serve multiple customers using the existing single pair of wires. Although customer premise devices such as intelligent telephones have been developed with digital electronics to allow the connection of more than one telephone to a single pair of wires, the present concept allows the older-type customer premise devices without such advanced electronics to be connected to a single remote terminal incorporating the necessary electronics thereby minimizing the problem of obsolescence of current CPD products.

Referring now to FIG. 1, it will be noted that a COT or central office terminal 12 is shown having an adjustable DC line feed 24 as well as a device for consolidating and encoding multiple incoming signals to a set of multiplexed digital signals for transmission over DSL lines 28 to a remote terminal 26. Initially, a minimal level DC voltage is applied from supply 24 to the lines 28. At remote terminal 26, the remote power converter 40 receives the incoming voltage and converts it to a regulated DC voltage which is shown supplied to the remote ring generator 42 as well as being supplied to block 32. The leads supplying the signal to block 32 are not shown specifically but are rather part of a plurality of leads connected to block 32. A reserve power detector shown as RP DET in block 40 checks the reserve power of the power converter and supplies a signal on lead 58 when this reserve power becomes less than a predetermined amount. The reserve power can be detected by any of many ways and in a flyback discontinuous pulse-width modulated power supply can be ascertained by some measurement related to the duty cycle. In other words, the ON or OFF of the switch 68 shown in FIG. 2 times could be checked against reference levels or the difference in time of one against the other could be used, etc. In any event, the device 32 detects the reserve power signal and returns a digital signal superimposed upon the DC supply voltage over lines 28 to the device 20 which detects the incoming request for additional voltage and supplies this signal to block 24.

While a first embodiment of the inventive concept only increased the incoming voltage in a single step, the concept includes the capability of continually increasing the voltage or increasing it in small steps and further includes the capability of increasing and decreasing the voltage to maintain a small reserve of power at the remote terminal thereby minimizing the voltage (and shock hazard to people) generated at the COT for application to the RT.

The pair of leads 28, in the embodiment shown, also contain multiple digital signals for instructing the remote terminal 26 to supply ringing signals to each one of any different telephone number connected customer premise devices such as 48 and 50. This is accomplished by relays such as 54 and 56 which apply ringing to CPD 48 and 50 while preventing the ringing signal from ring generator 42 from being returned to the individual FXS (foreign exchange subscriber) blocks such as 36 or 38.

The blocks such as 54 detect an off-hook condition of the associated CPD so as to disconnect the signal from the ring generator 42 and connect the CPD such as 48 to the foreign exchange subscriber block 36 and thereby complete the circuit so that signals from CPD 48 are encoded within block 32 and transmitted back over the DSL lines 28 to the encoder/decoder 20 whereby they are transmitted over the appropriate lines such as FXO (foreign exchange office) block 16 to the central office switch 10.

While FIG. 1 is shown with circuitry for the standard ISDN (Integrated Services Digital Network) format of two 64 kilobit channels and one 16 kilobit D channel, the concept can be used with other formats of circuitry with different encoding techniques so that more than three digital channels can be transmitted on the lines 28. It should also be realized that this concept can be used to supply the voltage on the leads 28 to a plurality of CPD's at the remote terminal site while the user traffic is actually supplie don separate fiber optic lines or other higher capacity lines than would typically be available in a set of POTS lines, as illustrated. This approach allows the powering of customer premise devices at a remote location from a reliable source such as the COT while permitting the increased bandwidth of fiber optic cable or other transmission media to the CPD. This can be viable alternative since the single pair 28 can provide power to supply electronics within a large number of CPD's at a remote site. In such a connection, the overhead signaling could be accomplished on either the POTS lines or on the fiber optic or other user traffic lines.

FIG. 2 illustrates one embodiment of a pulse-width modulator circuit where a variable input voltage is applied through a filter circuit 60 to the winding 70 of a transformer 72. This input DC voltage is shown in FIG. 3, waveform A, as the voltage from leads 62 to 66. The switch 68 is switched ON and OFF from the pulse-width modulator control circuit 64 which is driven by a synchronous input signal shown in FIG. 3 as waveform C. The clock signal on lead 106 is supplied to the pulse-width modulator control circuit 64 and is shown as waveform D. The clock input causes the switch 68 to turn ON, and a signal from monitor 98 causes the switch 68 to turn OFF. The diodes connected to the secondary windings of transformer 72 produce a DC output voltage which is regulated by the feedback from monitor 98. The duty cycle of the pulse-width modulator, as represented by the signal in waveform F, which is output from synchronous rectifier circuit 90 on lead 114, is used to clock the flip-flop 112.the flip-flop is turned OFF by the reset input on lead 110. This pulsating output from the Q output of flip-flop 112 charges capacitor C1 and produces a voltage V1, as illustrated in waveform H of FIG. 3. This waveform is shown as initially remaining high until the load, as shown in waveform B, increases. At this time, the pulse-width modulator is shown attempting to increase the output power with the result that the duty cycle increases resulting in a lowering of voltage V1. At a point illustrated by the changing of amplitude of waveform I where the voltage V2 becomes greater than voltage V1, an output on the RP lead 124 (from logic "1" to logic "0") indicates that an increased voltage is required. This increased voltage is shown on FIG. 3, waveform A, by the increase just prior to the break in the waveform.

A different set of circumstances is shown in the remaining portion of the set of waveforms where, with a constant load, the input voltage has slowly decreased over a period of time due to aging of the lines or for whatever reason the voltage might decrease, such that again the voltage V1 in waveform H becomes less than voltage V2, thereby requesting an increase in input voltage as supplied from the central office terminal.

FIG. 4 illustrates that if the supplied input voltage were V3, that the operation of the pulse-width modulator between zero output power and point B (corresponding to P1) would keep from providing a RP request output on lead 58 of the power converter. However, when the power requirement of the load is increased to just slightly more than P1, a new voltage represented as V4 would be requested on lead 58 and supplied to the circuit 60 (input of converter 40). The new curve shown from zero input voltage to F would represent the power curve and at that point in time, the pulse-width modulator would have the reserve from power P1 up to reserve power P2 before it would again call for additional increased voltage.

As explained before, the first embodiment of the present invention merely requested an increase but the concept allows for continual request changes both up, down and in multiple, discrete steps in accordance with detected reserve power available. By always having some reserve power, the system can cope with the small amount of time lag inherent between noting a requirement for more power, and sending the digital signal back to the control mechanism where it is decoded, and the adjustable DC line feed 24 can supply the additional voltage over the lines 28 to the pulse-width modulator.

It will be realized from general knowledge of telephone systems and the prior information, that the COT 12 would be one of many COT's at a central office switch in a typical application. As mentioned in the Detailed Description, FIG. 5 illustrates multiple situations of this concept used at a remote terminal such as those connected to COT shelf 152 where the remote terminal may be inside or outside buildings such as 158 and 160. The COT shelf could be remote from the central office as shown in block 166 where it is fed by high capacity multiplexed lines and then is connected to various other buildings as remote terminals. As further shown, the COT could comprise part of a shelf in a customer premise where it feeds not only various remote terminals within the customer premise but also feeds other remote terminals in nearby buildings.

While I have described several inventive concepts herein and have described a specific implementation, I wish to be limited not by the implementation shown but only by the scope of the appended claims wherein I claim:

1. A DC-DC (direct current to direct current) power conversion apparatus for use in a remote terminal of a telephone system which receives power from a voltage source located in a central office, wherein a substantial impedance exists between said power conversion apparatus and said central office, said power conversion apparatus comprising, in combination:

a PWM (pulse-width modulator) apparatus having a variable duty cycle, said PWM apparatus including input voltage supply means for receiving power from said voltage source and supplying a DC input voltage, and converter output means for supplying a converted output voltage to a load;

feedback control means, comprising a part of said PWM apparatus, for maintaining a given regulated DC output voltage at said converter output means over a range of load impedances by varying the duty cycle of said PWM apparatus; and detecting means, connected to said PWM apparatus, for supplying an output signal indicative of the reserve power available from said PWM apparatus, said reserve power output signal being derived as a function of the duty cycle of said PWM apparatus, said detecting means comprising:

means for measuring the duty cycle of said PWM apparatus; and means for providing said reserve power output signal when the duty cycle of said PWM apparatus exceeds a threshold level indicating that an increase in the power received from said voltage source is required.

2. The power conversion apparatus as set forth in claim 1 wherein said means for measuring the duty cycle further includes means for comparing the duty cycle of said PWM apparatus with said threshold level, said threshold level representing a minimum reserve power threshold.

3. The power conversion apparatus as set forth in claim 2 wherein said reserve power output signal is provided by said threshold detector when the duty cycle of said PWM apparatus exceeds said minimum reserve power threshold thereby indicating that an increase in the power received from said voltage source is required.

4. A DC-DC (direct current to direct current) power conversion apparatus for use in a remote terminal of a telephone system which receives power from a voltage source located in a central office, wherein a substantial impedance exists between said power conversion apparatus and said central office, said power conversion apparatus comprising, in combination:

a PWM (pulse-width modulator) apparatus having a variable duty cycle, said PWM apparatus including input voltage supply means for receiving power from said voltage source and supplying a DC input voltage, and converter output means for supplying a converted output voltage to a load;

feedback control means, comprising a part of said PWM apparatus, for maintaining a given regulated DC output voltage at said converter output means over a range of input supply voltage by varying the duty cycle of said PWM apparatus; and detecting means, connected to said PWM apparatus, for supplying an output signal indicative of the reserve power available from said PWM apparatus, said reserve power output signal being derived as a function of the duty cycle of said PWM apparatus, said detecting means comprising:

means for measuring the duty cycle of said PWM apparatus; and means for providing said reserve power output signal when the duty cycle of said PWM apparatus exceeds a threshold level indicating than an increase in the power received from said voltage source is required.

5. The power conversion apparatus as set forth in claim 4 wherein said means for measuring the duty cycle further includes means for comparing the duty cycle of said PWM apparatus with said threshold level, said threshold level representing a minimum reserve power threshold.

6. The power conversion apparatus as set forth in claim 5 wherein said reserve power output signal is provided by said threshold detector when the duty cycle of said PWM apparatus exceeds said minimum reserve power threshold thereby indicating that an increase in the power received from said voltage source is required.

7. A discontinuous flyback power conversion apparatus for use in a remote terminal of a telephone system which receives power from a voltage source located in a central office, wherein a substantial impedance exists between said external voltage source and said power conversion apparatus, said power conversion apparatus comprising, in combination:

DC (direct current) voltage supply means for receiving power from said voltage source and supplying an input signal which may vary in voltage amplitude;

load impedance output means for connection to a load whose impedance may vary;

a variable duty cycle PWM (pulse-width modulator) apparatus, connected between said DC voltage supply means and said load impedance output means and including control input means for supplying a converted input voltage to a load, said control input means including a power switching element for controlling the duty cycle of said PWM apparatus;

feedback control means, connected to said control input means of said PWM apparatus, for maintaining a given regulated output voltage to said load impedance output means; and detecting means, connected to said PWM apparatus, for supplying an output signal indicative of the reserve power available from said power conversion apparatus, said reserve power output signal being determined as a function of the duty cycle of said PWM apparatus, said detecting means comprising:

means for detecting an actual pulsed on-time of said power switching element and providing a signal indicative of the duration of said actual pulsed on-time;

means for detecting a maximum available pulsed on-time of said power switching element and providing a signal indicative of the duration of said maximum available on-time;

means for comparing said actual pulsed on-time with said maximum available pulsed on-time of said power switching element and providing a signal representing the difference therebetween in order to derive an unused pulsed on-time of said power switching element;

means for converting said unused pulsed on-time signal to a voltage level;

means for generating a stable reference voltage representing a minimum reserve power threshold; and a threshold detector for comparing said unused pulsed on-time voltage level with said stable reference voltage, said threshold detector supplying said reserve power output signal when said stable reference voltage is greater than said unused pulsed on-time voltage level thereby indicating that said minimum reserve power threshold has been exceeded and an increase in the power received from said voltage source is required.

* * * * *